United States Patent

Eastman

(10) Patent No.: US 6,907,032 B2
(45) Date of Patent: Jun. 14, 2005

(54) METHOD FOR SELECTING TERMINATING GATEWAYS FOR AN INTERNET TELEPHONE CALL USING A TREE SEARCH

(75) Inventor: Jeffrey F. Eastman, Sunnyvale, CA (US)

(73) Assignee: GoRemote Internet Communications, Inc., Milpitas, CA (US)

( * ) Notice: Subject to any disclaimer, the term of this patent is extended or adjusted under 35 U.S.C. 154(b) by 798 days.

(21) Appl. No.: 09/799,471

(22) Filed: Mar. 5, 2001

(65) Prior Publication Data

US 2001/0050911 A1 Dec. 13, 2001

Related U.S. Application Data

(60) Provisional application No. 60/186,966, filed on Mar. 6, 2000.

(51) Int. Cl.[7] ............................. H04L 12/66; H04M 7/00
(52) U.S. Cl. ................................. 370/352; 379/221.02
(58) Field of Search ............................... 370/352, 356, 370/401; 379/221.02; 709/241

(56) References Cited

U.S. PATENT DOCUMENTS

| | | | | |
|---|---|---|---|---|
| 5,970,126 A | | 10/1999 | Bowater et al. ............. | 379/114 |
| 6,014,659 A | * | 1/2000 | Wilkinson et al. ............. | 707/3 |
| 6,069,890 A | * | 5/2000 | White et al. ................ | 370/352 |
| 6,078,582 A | | 6/2000 | Curry et al. ................ | 370/356 |
| 6,157,648 A | | 12/2000 | Voit et al. .................... | 370/401 |
| 6,229,804 B1 | * | 5/2001 | Mortsolf et al. ............. | 370/352 |
| 6,426,955 B1 | * | 7/2002 | Gossett Dalton et al. ... | 370/401 |
| 6,584,110 B1 | * | 6/2003 | Mizuta et al. ............... | 370/401 |
| 6,690,651 B1 | * | 2/2004 | Lamarque et al. .......... | 370/252 |
| 6,760,324 B1 | * | 7/2004 | Scott et al. ................. | 370/352 |
| 6,829,221 B1 | * | 12/2004 | Winckles et al. ........... | 370/238 |
| 6,829,232 B1 | * | 12/2004 | Takeda et al. .............. | 370/352 |
| 2004/0258239 A1 | * | 12/2004 | Gallant et al. .............. | 379/900 |

FOREIGN PATENT DOCUMENTS

| | | |
|---|---|---|
| EP | 0 881 812 A2 | 12/1998 |
| EP | 1 065 862 A2 | 12/2001 |
| WO | WO 97/27692 | 7/1997 |
| WO | WO 97/33412 | 9/1997 |
| WO | WO 98/05145 | 2/1998 |
| WO | WO 98/23079 | 5/1998 |
| WO | WO 98/37665 | 8/1998 |
| WO | WO 00/52916 | 9/2000 |

OTHER PUBLICATIONS

Gary A. Thom, H.323: The Multimedia Communications Standard for Local Area Networks, *IEEE Communications Magazine*, pp. 52–56 (Dec. 1996).

Hansson et al., Phone Doubler—A step towards integrated Internet and telephone communities, *Ericsson Review*, No. 4, pp. 142–151 (Jan. 1997).

Robin Gareiss, Voice Over The Internet, *Data Communications*, pp. 93–100 (Sep. 1996).

International Search Report for international Application No. PCT/US01/07083, European Patent Office, pp. 1–3 (May 28, 2002).

* cited by examiner

*Primary Examiner*—Hassan Kizou
*Assistant Examiner*—Hong S. Cho
(74) *Attorney, Agent, or Firm*—Fenwick & West LLP

(57) ABSTRACT

A tree search method for selecting one or more servers for terminating an Internet telephone call. The tree comprises a plurality of nodes, each having a digit field, an object field, and a children array field. If the object of the current node is not null, it is added to a list of suitable equipment. A prefix parameter is formed from part of a destination telephone number and used to index into a children array to find a sub-tree node. If that array element is not null, the search is recursively applied to that node by passing the stripped prefix parameter and the result list. The search walks down the tree consuming the available digits in the prefix parameter and accumulating entries in the list of servers that can terminate the call.

10 Claims, 4 Drawing Sheets

US 6,907,032 B2

METHOD FOR SELECTING TERMINATING GATEWAYS FOR AN INTERNET TELEPHONE CALL USING A TREE SEARCH

This application claims priority of provisional patent application Ser. No. 60/186,966, filed Mar. 6, 2000.

BACKGROUND OF THE INVENTION

1. Technical Field

The present invention relates to telephone calls placed over the Internet, and more particularly to a method that uses a tree search for selecting a gateway server to terminate the Internet telephone call.

2. Background Information

One of the most exciting recent developments in the Internet is the transmission of voice data packets over the Internet. This development allows the Internet to be used for completing long distance telephone calls. For example, U.S. Pat. Nos. 5,867,495 and 5,867,494 illustrate a system that allows telephone calls, data and other multimedia information to be routed through a hybrid network that includes transfer of the information across the Internet.

In a typical Internet telephone call, a call initiating gateway terminal receives a normal voice telephone call from a PSTN system and converts it to a digital voice data packet format that can be transmitted over the Internet. The International Telecommunications Union (ITU) standard H.323 sets a protocol to be used in such processes. On the receiving end, a call terminating gateway terminal receives the call from the Internet and converts the call back to a format that can be transmitted over the PSTN system. The call is then routed over the PSTN system to the receiving party.

In order to make this technology practical to use, a methodology is needed for selecting call terminating gateway terminals.

SUMMARY OF THE INVENTION

Briefly, the present invention comprises a tree search method for selecting one or more servers for terminating an Internet telephone call. The parameters to the tree search are a PstnPrefix that represents the destination telephone number, and a Vector in which to put the result. The tree comprises a plurality of nodes, each having a digit field, an object field, which identifies appropriate servers for terminating the call, and a children array field. If the object of the current node is not null, it is added to the result Vector.

The leading digit of the parameter PstnPrefix is stripped and used to index into a children array to find a sub-tree node. If that array element is not null, then the search is recursively applied to that node by passing the stripped PstnPrefix and the result Vector. The search walks down the tree consuming the available digits in the parameter PstnPrefix and accumulating a Vector of EquipmentForPrefix objects that contain the desired RtsEquipment objects to terminate the call.

Since the search is a tree search, its performance is logarithmic to the base 10 (i.e. $\log_{10}(x)$) of the length of the longest prefix (x) that has terminating equipment specified. In common implementations, this length is less than 5 digits, resulting in a very fast search.

DETAILED DESCRIPTION OF THE INVENTION

The present invention is an improved method for selecting a group of devices (e.g. gateway servers) that satisfy certain criteria for terminating an Internet telephone call. These criteria include but are not limited to connectivity, compatibility, contractual relationships, cost and quality of service. The method makes extensive use of the computer programming methodology illustrated by the prefix search tree shown in FIG. 4.

Figure 1:
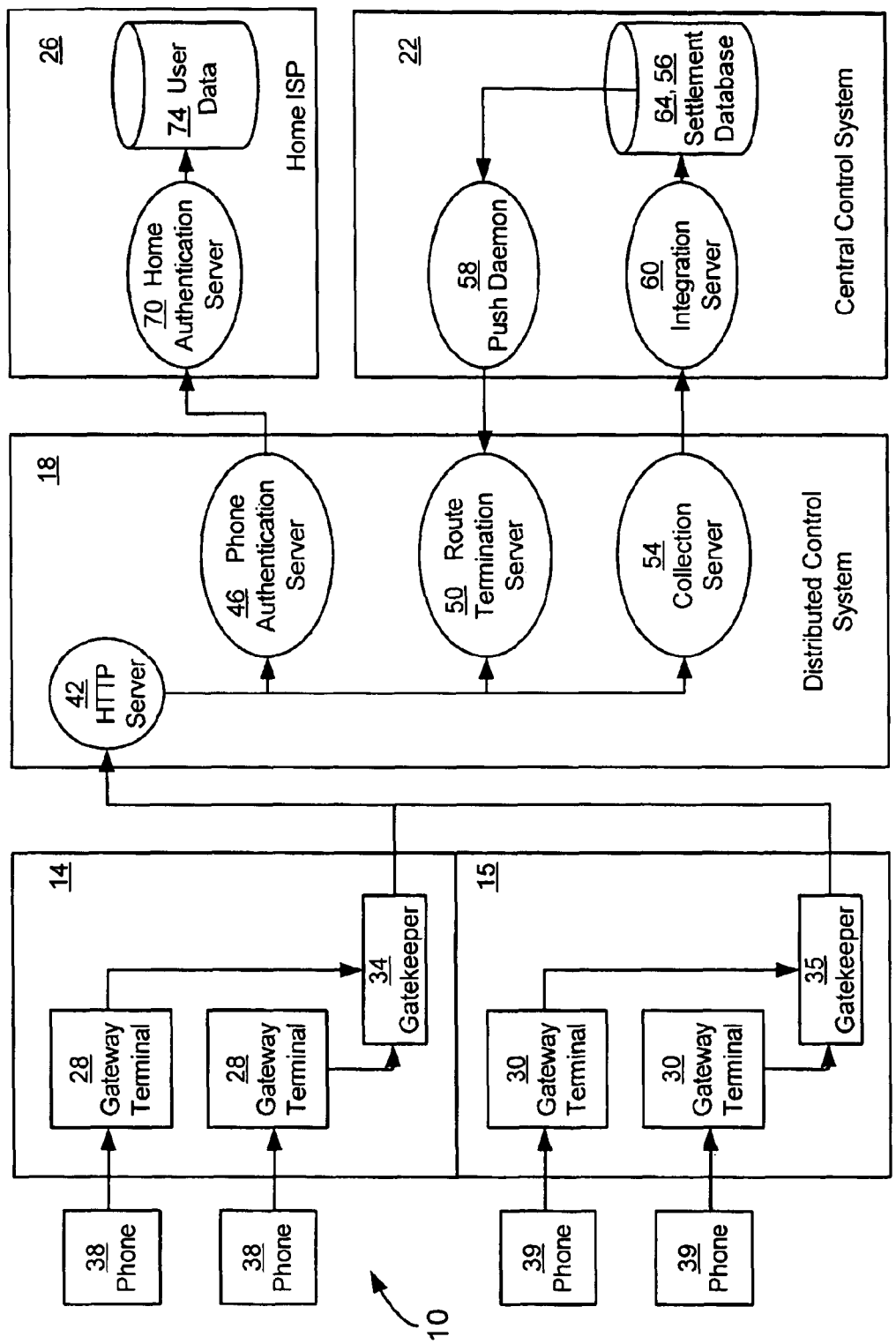
FIG. 1 is a schematic diagram of an Internet telephone system.
Figure 2:
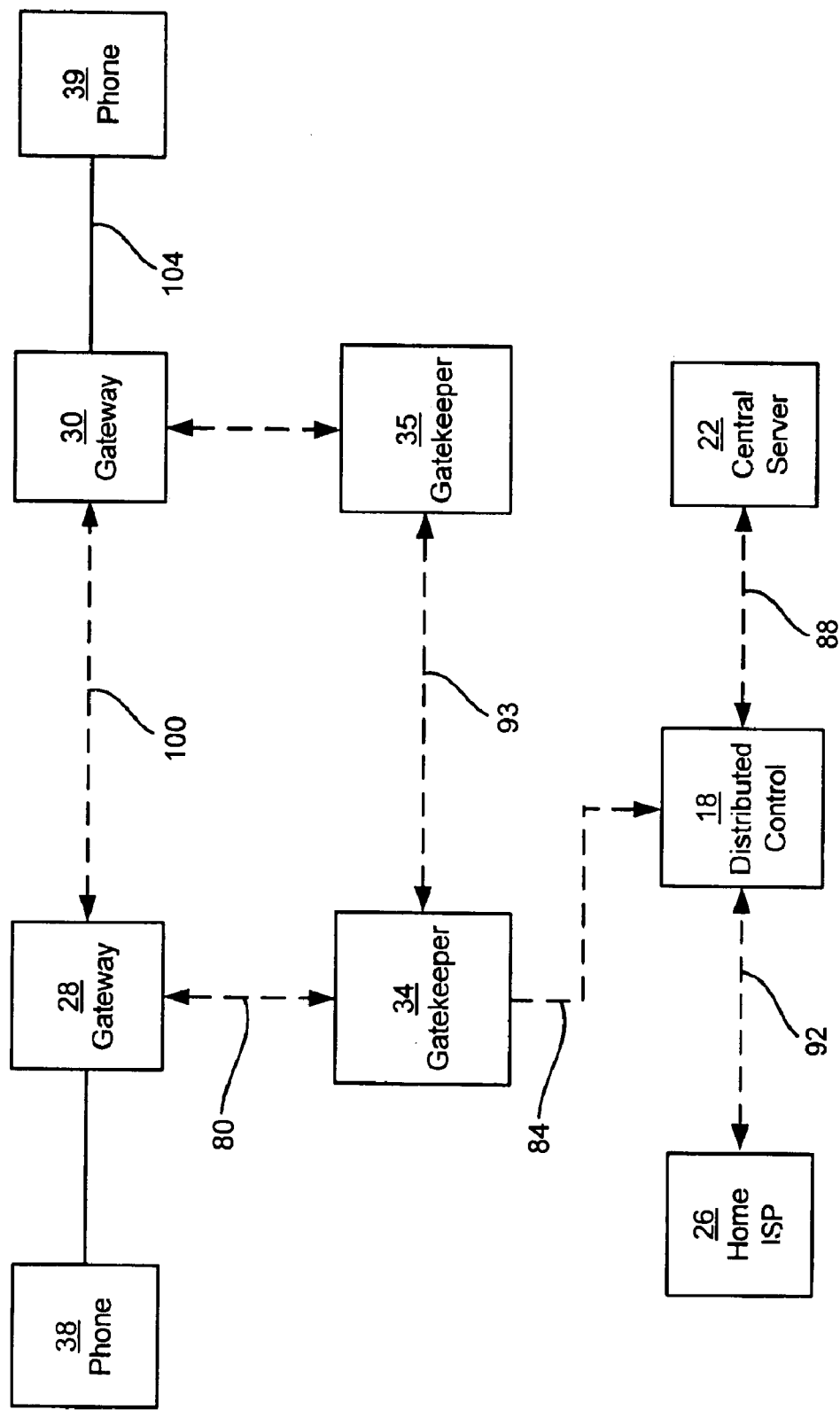
FIG. 2 is a schematic diagram illustrating the connections utilized in making an Internet telephone call.
Figure 3:
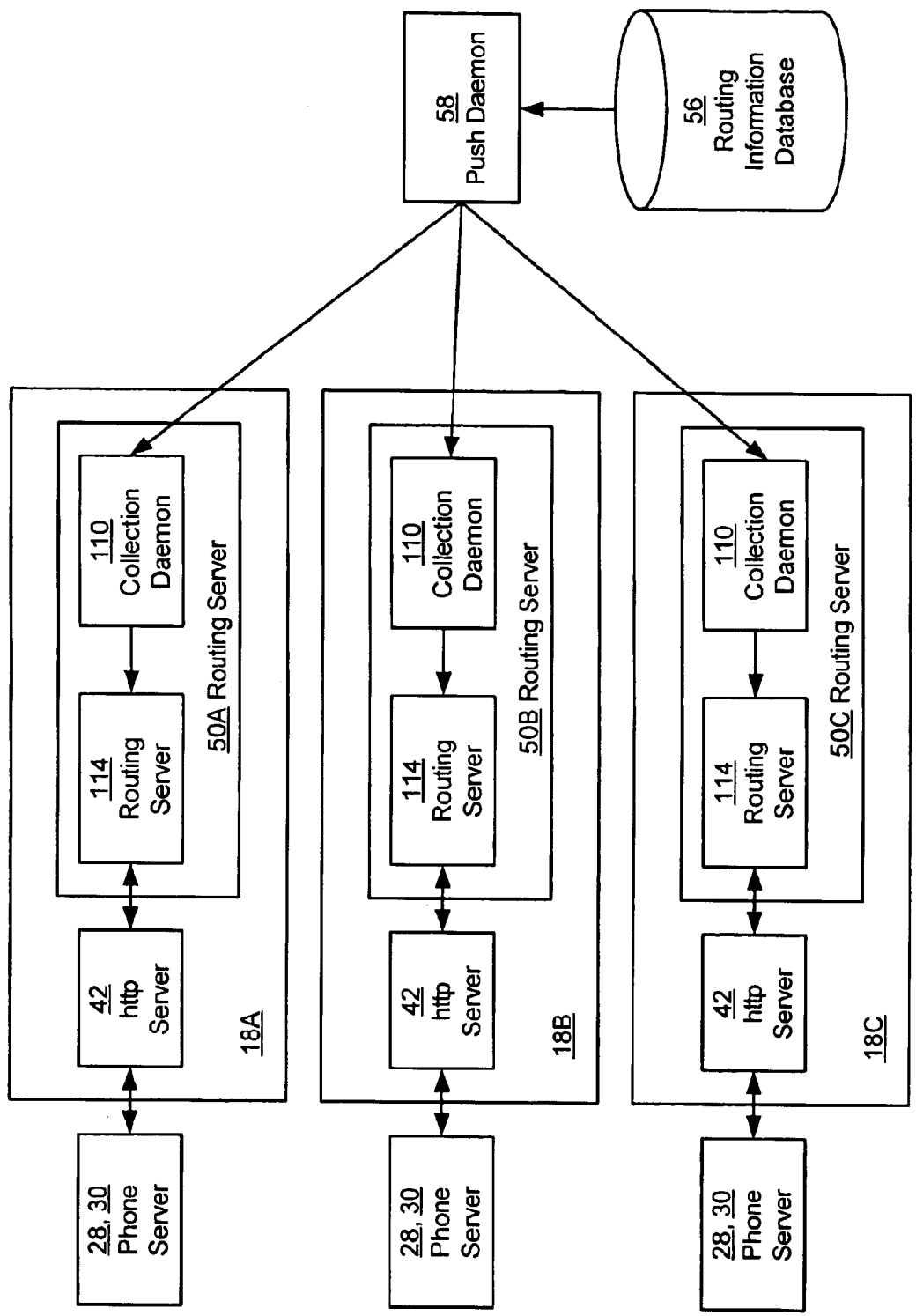
FIG. 3 is another schematic diagram of an Internet telephone system.

FIGS. 1–3 illustrate a system and methodology used in making Internet telephone calls. FIG. 1 illustrates an Internet telephone system 10 comprised of a distributed control system 18 and a central control system 22. A home Internet Service Provider (ISP) system 26, a call originating system 14 and a call terminating system 15 can all communicate with the distributed control system over the Internet. The call originating system 14 comprises a plurality of gateway terminals 28, and the call terminating system comprises a plurality of gateway terminals 30. In the preferred embodiment, the terminals 28 interact with a gatekeeper server 34, and the terminals 30 interact with a gatekeeper 35. As is explained below, in the present invention, the gatekeeper servers 34 and 35 are not required.

Preferably the terminals 28 and 30 are commercially available servers referred to as H.323 gateway terminals and the gatekeeper server 34 is a commercially available server referred to as an H.323 gatekeeper. The terminals 28 and 30 and the gatekeeper server 34 are available from companies such as Lucent Technologies, Cisco Systems and Siemens. The terminals 28 and 30 may or may not all be manufactured by the same company and/or have the same level of functionality. However, in the preferred embodiment, the terminals 28 and 30 all perform to a common compatibility standard, such as the H.323 standard.

As is explained in more detail below, each of the terminals 28 is capable of making an Internet connection with one of the terminals 30. Similarly, each of the terminals 30 is capable of making an Internet connection with one of the terminals 28. Preferably, the terminals 28 and 30 use a combination of software and a local access network (LAN) interface card to establish the Internet connections. In one embodiment, the gatekeeper 34 includes application program interface (API) software that controls communication between the call originating system 14 and the distributed control system 18. In preferred embodiments, the API software is present on the gateway terminals 28 and/or gateway terminals 30 so that these terminals can communicate directly with the distributed control system 18. In this case, the gateway terminals 28 and 30 include a means for establishing an Internet connection with the distributed control system 18, such as a combination of software and a LAN interface card.

For reference purposes, the numeral 28 is used to designate a gateway terminal that is initiating an Internet telephone call, and the numeral 30 is used to designate a gateway terminal that is terminating an Internet telephone call. However, the initiating gateway terminals (servers) 28 can also function as the terminating terminals (servers) 30, and vice versa. When functioning as a gateway terminal that initiates an Internet telephone call, the gateway terminal 28 accepts a PSTN signal, converts it to a digital signal and sends the digital signal over the Internet. When functioning as a gateway terminal that terminates an Internet telephone call, the gateway terminal 30 accepts a digital signal from the Internet and converts the digital signal to a PSTN signal that is then transmitted over a PSTN system.

A plurality of telephone sets 38 are connected to the terminals 28 and a plurality of telephone sets 39 are connected to the terminals 30. The telephone sets 38 and 39 each have the same capabilities. The different reference numerals are used simply to emphasize that initially one telephone set is used to initiate the Internet telephone call, and a second telephone set is used to receive the telephone call.

While FIG. 1 illustrates one telephone set being connected to each terminal 28 or 30, each of the terminals 28 and 30 are capable of having a plurality of telephone sets 38 and/or 39 connected to the single terminal 28 or 30 at any given time. The telephone sets 38 and 39 may be any type of telephone having a dialer and capable of permitting voice communication through a publicly switched telephone network (PSTN) or cellular network. In the preferred embodiment the telephone sets are standard pushbutton telephones used for making and receiving standard telephone calls. These include desktop and wall phones, phones in PBX systems, cordless phones and cell phones, as well as computers equipped to make voice telephone calls.

The gatekeeper server 34 is a server that enables a plurality of the terminals 28 to establish an Internet connection with the distributed control system 18. The gatekeeper server 34 includes application program interface (API) software that controls communication between the call originating system 14 and the distributed control system 18. The gatekeeper server 35 allows a plurality of the gateway terminals 30 to communicate over the Internet with the gatekeeper server 34 and or with the distributed control system 18.

The distributed control system 18 comprises an http server 42, a route termination server 50 and a collection server 54. Optionally, the system 18 may also include a phone authentication server 46. The central control system 22 comprises a routing database 56 and a push daemon 58. Preferably, the central control system 22 also includes an integration server 60 and a settlement database 64 for storing accounting data. Also, in the preferred embodiment, the routing database 56 is part of the settlement database 64.

The home Internet Service Provider (ISP) system 26 comprises an authentication server 70 and a database 74 of user data. The ISP system 26 and the phone authentication server 46 are only needed in the situation where the telephone call is not being initiated through the user's home ISP. This situation is referred to as roaming. In the non-roaming situation, the gateway terminal 28 is operated by an ISP with whom the user of the phone 38 has an account. In this situation, the user is identified as a customer of the ISP by the call originating system 14.

In contrast, in the roaming situation, the user of the telephone 38 is not a customer of the ISP that operates the call originating system 14. In this case, the user must be authenticated by the ISP system 26 via the phone authentication server 46. The user of the telephone 38 is a customer of the ISP that operates the Home ISP system 26, and hence can be authenticated by the Home ISP system 26.

FIG. 2 illustrates the way an Internet telephone call is made using the present invention. The initiating party uses the telephone set 38 to connect to the gateway terminal 28, typically over a telephone line. The gateway terminal 28 establishes a connection with the gatekeeper 34 as is indicated by the arrow 80. Preferably, the arrow 80 indicates an Internet connection, but it could also be a different type of network connection, such as a local area network (LAN) connection. Similarly, a connection is established between the gateway terminal 30 and the gatekeeper 35. This is preferably an Internet connection, but it could also be a different type of network connection, such as a local area network (LAN) connection.

The gatekeeper 34 uses the API software to establish an Internet connection with the http server 42 within the distributed control system 18 as indicated by the arrow 84. In the present invention, the gatekeeper 34 may be eliminated, and the API software may run directly on the gateway terminal 28. In the preferred embodiment, the terminal 28 communicates directly with the distributed control system 18, using the API software.

Certain servers within the distributed control system 18 establish an Internet connection with the central control system 22, and optionally, with the home Internet Service Provider (ISP) system 26, as is indicated by the arrows 88 and 92, respectively. Additionally, an Internet connection can exist between the gatekeeper 35 and the gatekeeper 34 as is indicated by the arrow 93. Ultimately, an Internet connection between the terminals 28 and 30 is established, as is indicated by the arrow 100. The terminal 30 establishes a connection to the telephone set 39, typically over a telephone line, as is indicated by the line 104. The net result of these various connections is that a telephone conversation can take place between the telephones 38 and 39, using the Internet as at least part of the transmission network for the telephone call.

FIG. 3 illustrates the way the route termination server 50 is supplied with updated information about routing decisions. The routing database 56 is located in the central control system 22 and is continuously updated to reflect changes in routing information related to the gateway terminals 30. In the preferred embodiment, such information includes, for example, address information, status information, area code/country code information, regional information (e.g. USA, Canada, Europe), quality of service information, contractual information and rate information. Address information includes information such as the IP address of the gateway terminal 30 and/or the gatekeeper 35. Status information includes information such as whether or not a particular terminal 30 is available for use (e.g. is the terminal 30 operational or is it undergoing maintenance). Quality of service information includes information about the signal delays, packet loss and jitter over the Internet as well as quality information about the terminating terminal's PSTN connection. Contractual information includes required and excluded service providers that may affect routing decisions. Rate information includes information such as the price set by the ISP that operates the call terminating system 15 for using its gateway terminals 30 to complete an Internet telephone call. In the preferred embodiment, the routing database 56 is an Oracle database.

Whenever it is desired to update the route termination server 50, the push daemon 58 establishes an Internet connection (TCP/IP) with a collection daemon 110 within the route termination server 50. Once the connection is established, the push daemon 58 transfers the new/updated routing information from the routing database 56 to the collection daemon 110. The collection daemon 110 then transfers the routing information to a routing server 114 within the route termination server 50 using inter-process communication (IPC).

In FIG. 3, a plurality of the route termination servers 50 are shown and denoted as servers 50A, 50B and 50C. In practice, the servers 50A, 50B and 50C would be located in different geographical locations. For example, server 50A might be located in Asia; server 50B in the United States and server 50C in Europe. The use of the push daemon 58 permits all of the servers 50A–C to be provided with updated routing information simultaneously, so that all of the route termination servers 50 are using the same information to make routing decisions. Additionally, the routing information only needs to be updated on one database (i.e. the routing database 56) to update all of the plurality of route termination servers 50. Preferably, the routing database 56 is part of the central control system 22, and hence this is the logical location to be inputting updated routing information. In the preferred embodiment, the route termination servers 50A–C are Sun Solaris™ servers, but other types of servers can also be used.

FIG. 1 and FIG. 3 also illustrates that every distributed control system 18 includes an http server 42. Each http server 42 comprises software running on a server that interacts with the API software running on the gatekeeper 34 (or with the gateway terminal 28 if a gatekeeper is not used), and with the routing server 114. The function of the http server 42 is to allow information to flow between the gatekeeper 34 (or gateway terminal 28) and the distributed control system 18 using an http protocol. In the preferred implementation, the http protocol is the Open Settlement Protocol (OSP) defined by the European Telecommunications Standards Institute (ETSI). The connection between the http server 42 and the routing server 114 is through Interprocess Communication (IPC), preferably, CORBA (common object request broker architecture). Similarly, the phone authentication server 46 and the collection server 54 (all shown in FIG. 1) all utilize the http server 42 to communicate with the call originating system 14.

FIG. 3 also illustrates the situation where the API software is running on the gateway terminal 28. In this situation, information can be transmitted directly between the gateway terminal 28 and the distributed control system 18 without the intervention of a gatekeeper server 34.

The various components shown in FIGS. 1 and 2 have the following functions. The http server 42 provides the gatekeeper server 34 with a standard mechanism for accessing the other servers in the distributed control system 18. Specifically, the http server 42 forwards requests for information to the authentication server 70, requests for authorization to the route termination server 50 and usage indications to the collection server 54. When the gatekeeper 34 is booted up, it is configured with the Internet address of at least one http server 42 that handles the type of service that is requested (i.e. Internet telephony).

Subsequently, for example when the gatekeeper server 34 receives an ARQ (ARQ means admission request) from the terminal 28, the gatekeeper server 34 connects with the http server 42 to send an authentication request for a roaming user. The gatekeeper already knows the IP address of the http server 42 because it was supplied previously in the process described above.

The phone authentication server 46 receives the request from the http server 42 and decodes the format of the access number. The access number is a string of digits entered by the person initiating the phone call via the telephone handset. In the preferred embodiment, three basic pieces of information that are contained in the access number: the organization ID, the account ID and a PIN number. The organization ID identifies the entity that will authenticate the phone call. Generally, this means determining the IP address of the home authentication server 70, for example, by consulting a directory service. Authenticating the phone call means deciding if the phone call is to be allowed or not, and is based on policy decisions such as whether or not the caller has an account and whether the account is paid up or in arrears. The account ID is the digit string used to identify the account holder, analogous to a user ID. And the PIN is a password used by the account holder to maintain the security of the account.

In the preferred embodiment, the input to the phone authentication server 46 includes the client type, the access number and the destination number (which is optional). The client type is the description of the gatekeeper server 34 that includes the manufacturer and type of gateway (e.g. Cisco 5300). The output from the phone authentication server 46 back to the http server 42 and hence to the gatekeeper server 34 is an instruction that the phone call is either authenticated (allowed) or not authenticated (not allowed).

The route termination server 50 receives a routing request from the originating terminal 34 via the http server 42, and selects one or more of the gateway terminals 30 that are candidates to complete a phone call or other service requiring PSTN termination. In other words, the server 50 selects a gateway terminal that will act as a link between the Internet and the PSTN telephone service that will connect the telephone call to the receiving party. In the preferred embodiment, the inputs to the route termination server 50 from the gatekeeper 34, are the service type (i.e. VoIP), the IP address of the gatekeeper 34 and the destination number, which is the final destination phone number that the terminal 30 needs to call. The destination number usually includes the country code and/or area code. The local telephone number is generally not used in the routing decision, although the city code might be used. The output from the server 50 is an ordered list of terminals 30 that could function as the link between the Internet and the receiving phone system. In the preferred embodiment, the list includes the Internet (IP) address of each gateway terminal 30 contained in the list.

In order to create a list of terminals 30 that are candidates to complete a phone call or other service, the route termination server 50 is capable of making routing decisions. The routing decisions are based on one or more essential conditions and on one or more policies. In general, a policy is defined by one or more service dimensions. The routing decision is controlled by a computer program running on the routing server 114 referred to as a route policy program. The route policy program generates the prioritized list of terminals 30 (and their associated gatekeepers 35, if relevant) based on data stored on the routing server 114.

In the preferred embodiment, the essential conditions include the type of service, interoperability and availability. Type of service refers to the type of service requested by the initiating party, such as basic telephone service or fax, etc. Interoperability is the ability of the terminal 30 to work acceptably with a terminal 28 or other device from a different vendor or with a different release level. For Internet telephony, the H.323 standard is supposed to ensure interoperability between systems from different vendors. However, since some phone products may not achieve full interoperability, a compatibility matrix must be maintained by the route termination server 50. Availability refers to whether a terminal 30 is in-service or out-of-service. In the present embodiment, the availability of the terminals 30 is manually entered in the routing database 56. However, this process can be automated, for example through the use of a network management facility that is used to track the availability of the terminals 30 and propagate the status information to the server 50.

The service dimensions help to order acceptable terminals 30 by various criteria. Typical service dimensions include the cost of a service and the various service relationships that exist in completing the call. The cost of a service is often based upon the actual phone tariffs between the terminating server (terminal 30) and the destination phone or fax. Sometimes other competitive considerations also come into play. The actual cost payable to the terminating member is an amount they specify for each telephone number prefix a server is allowed to terminate to. The prefix may be just a country code or include more digits, e.g. area codes. Each member may have different servers in different regions with different area code costs. Therefore, the costs may be both member and region specific.

Service relationships relate to various partnership arrangements that may exist between the owner of the terminating server (terminal 30) and the owner of the originating server (terminal 28). For example, members of an alliance may agree to preferentially use the terminals of other alliance members whenever possible. Thus, the route termination server 50 must allow for the specification of ISP partner lists that can be associated with an originating server (terminal 28). Once the partner lists are established, policies can be set which define preferences or mandatory use of partner services.

Another service dimension is Quality of Service (QoS). The quality of the Internet connections between the terminals 28, 30 is highly variable, as packets travel over various routes to reach their destinations. Since the quality of the PSTN connections between the terminal 30 and telephone 39 is also highly variable, the routing policy needs to be able to be able to balance the needs of the originator for least cost and high quality connections. In the preferred implementation, quality of service is reduced to costs that offset and adjust the termination costs to produce a balanced routing decision.

When all other essential conditions and policies have been satisfied, other factors can be taken into account, such as load balancing. Load balancing refers to the practice of routing calls to terminals 30 that are not receiving more than a certain number of calls. Load balancing based upon accurate global information about the state of the terminals 30 is difficult to achieve and requires much communications overhead. This does not scale well as the number of servers grows. However, a simple scheme of randomizing the adjusted costs so that the same terminals will not always be selected works well.

In the present invention, an ordered list of gateway terminals 30 is constructed by the RTS server 50. Each of the terminals 30 on the ordered list are capable of terminating an Internet telephone call initiated by the gateway terminal 28. The RTS Routing Criteria are a set of rules applied to the ordered list of candidate terminating devices (terminals 30). Based on the destination phone number, alliance member rate plans, quality of service and other information, the RTS Routing Criteria select the servers that can terminate the call with the least cost and the highest quality. The algorithm used to construct the ordered list is as follows (actual Java classes used in the preferred implementation are italicized):

1) Determine the originating RtsEquipment from its IP address. This is done by querying a Hashtable maintained by the RTS.

2) Determine the consuming RtsAllianceMember from its member Id. If no member is provided in the request, obtain the consuming alliance member from the originating equipment. This is done by querying another Hashtable maintained by the RTS.

3) Ensure that the originating and consuming alliance members will do business with each other (i.e. no member exclusions apply). This is done by checking the Restrictions of each RtsAllianceMember to ensure that they do not exclude each other.

Figure 4:
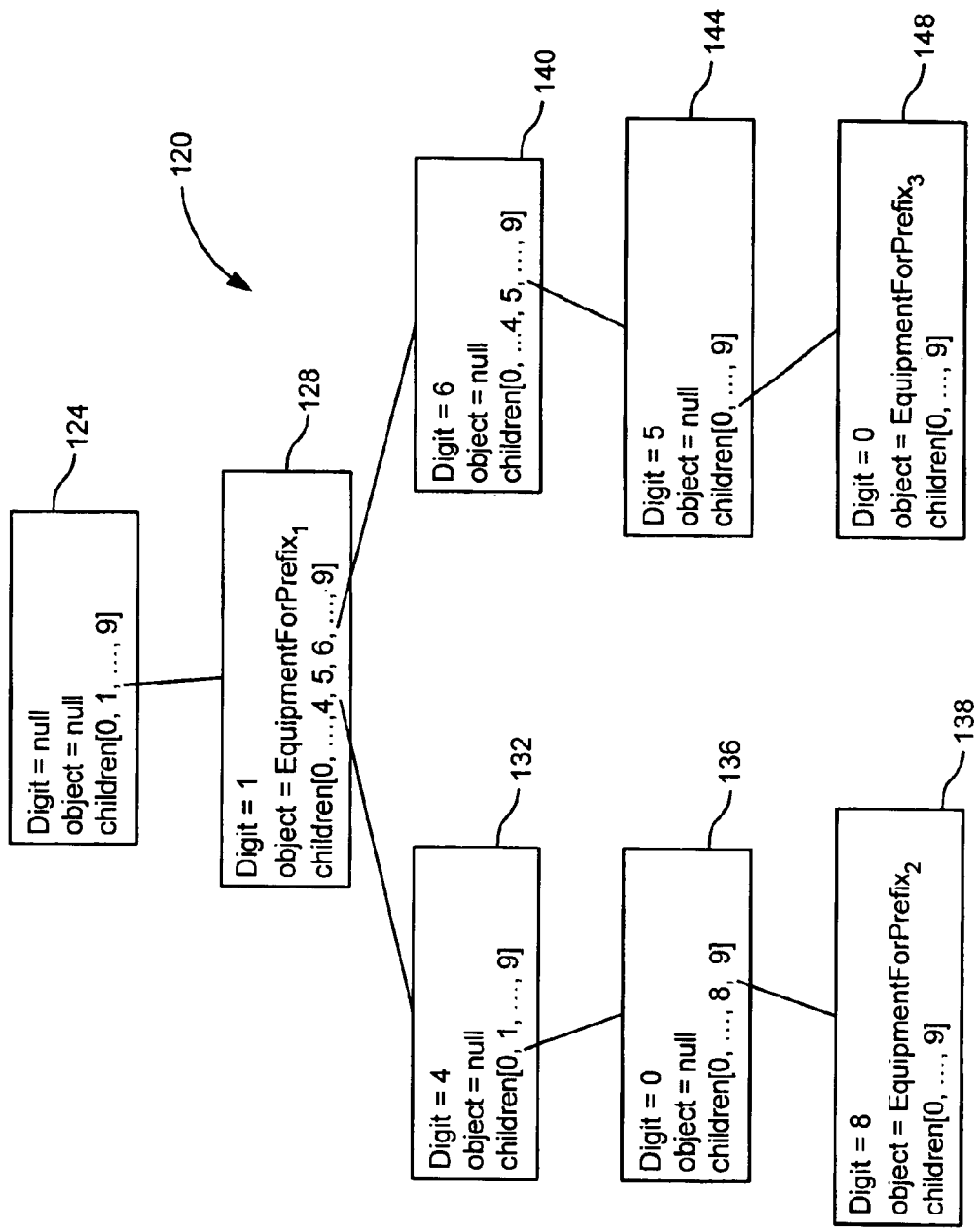
FIG. 4 illustrates a search tree according to the present invention.

4) From the destination phone number, compute a list of RtsEquipment objects that can terminate that number. This list consists of sets of equipment that have been configured to terminate calls for a given PstnPrefix and is ordered from the most to the least general prefix (e.g. equipment terminating prefix "1" will be before equipment terminating "1-408"). Elaborate this list in reverse order, so that equipment with the most specific prefix will be considered first.

a) This step involves a novel searching strategy that is implemented by the PrefixSearchTree and EquipmentForPrefix classes.
  i) PrefixSearchTree implements the fast prefix lookup behavior required for determining zones based on a PstnPrefix. It also implements the behavior for adding new prefixes to the tree. PrefixSearchTree contains the following fields:
    (1) char digit—The digit of the prefix represented by this node of the search tree. This field is used to reconstruct PstnPrefixes by recursively searching the tree and is not used by the Route Termination search.
    (2) Object object;—An object corresponding to the prefix terminating at this node. In the Route Termination application, this field is an EquipmentForPrefix object, defined below.
    (3) PrefixSearchTree children[]—An array often PrefixSearchTrees that hold the sub trees of this node. This field forms a recursive tree structure that can encode a PstnPrefix of any number of digits.
  ii) In the RTS searching implementation, the Object stored in the object field is an EquipmentForPrefix object that contains the RtsEquipment objects that have been specified to terminate the prefix represented by each node in the tree. In the tree 120 shown in FIG. 4 (discussed below), three such objects have been defined that contain the equipment that can terminate prefixes "1", "1-408" and "1-650". The EquipmentForPrefix contains the following fields:
    (1) PstnPrefix prefix—The full prefix for which the equipment applies.
    (2) Vector equipment—A Vector of RtsEquipment objects that can terminate the prefix.
  b) FIG. 4 illustrates a prefix search tree 120 that represents the prefixes 1-408 and 1-650. In order to construct the ordered list of gateway terminals 30 that can terminate an Internet telephone call (i.e. the list specified in step 4, above), the tree 120 is searched from the root in the following manner:
    i) The parameters to the search operation are a PstnPrefix that represents the destination telephone number, and a Vector in which to put the result.
    ii) If the object of the current node is not null, it is added to the result Vector.
    iii) The leading digit of the parameter PstnPrefix is stripped and used to index into the children array to find a sub-tree node. If that array element is not null, then the search is recursively applied to that node by passing the stripped PstnPrefix and the result Vector.

iv) The search walks down the tree 120 consuming the available digits in the parameter PstnPrefix and accumulating a Vector of EquipmentForPrefix objects that contain the desired RtsEquipment objects to terminate the call.

c) Since the search is a tree search, its performance is logarithmic to the base 10 (i.e. $\log_{10}(x)$) of the length of the longest prefix (x) that has terminating equipment specified. In common implementations, this length is less than 5 digits, resulting in a very fast search.

i) In the above example (illustrated in FIG. 4), searches for the following numbers would yield the following EquipmentForPrefix objects:

(1) "0-516-555-1212" would return an empty Vector in one search step, since the "0" children entry of the top node 124 is null.

(2) "1-213-555-1212" would return a Vector with EquipmentForPrefix$_1$ in two search steps, since the search would terminate at the node 128 when the children entry for "2" is null.

(3) "1-408-555-1212" would return a Vector with EquipmentForPrefix$_1$ and EquipmentForPrefix$_2$ in five search steps, since the search would terminate at the node 138 when the children entry for "5" is null.

(4) "1-650-555-1212" would return a Vector with EquipmentForPrefix1and EquipmentForPrefix$_3$ in five search steps, since the search would terminate at the node 148 when the children entry for "5" is null.

5) For each set of equipment that can terminate a given prefix (EquipmentForPrefix equipment), determine if it can interoperate with the originating equipment determined in step 1. If not, skip this equipment. This is done by comparing the EquipmentModels associated with the originating and terminating RtsEquipment to see if they are compatible.

a) Equipment compatibility is neither transitive nor commutative. Thus, type A→B compatibility does not imply type B→A compatibility. Further, type A→B compatibility and type B→C compatibility do not imply type A→C compatibility.

6) Determine if the alliance member that owns the terminating equipment will do business with the originating and consuming alliance member (i.e. no member Restrictions apply). Determine if a more specific terminating equipment for that alliance member has already been identified in this search. Skip this equipment if both of these conditions are not satisfied.

7) Determine an adjust termination cost for this equipment as follows:

a) Determine the applicable rate plan for the terminating alliance member and from this compute a termination cost.

b) Determine the link quality of service between the originating and terminating equipment. From this compute an IP quality cost adjustment.

c) Determine the link quality of service between the terminating equipment and destination prefix. From this compute a PSTN quality cost adjustment.

d) Determine if the terminating member has a cost adjustment for the destination number and from this compute a routing cost adjustment.

e) Compute a small random cost adjustment so that equipment otherwise having identical costs will be ordered randomly to provide load leveling.

f) Insert the terminating equipment into a sorted list using a total cost obtained by summing the termination cost, and the various cost adjustments.

8) After all equipment has been processed, return the first n equipment IP addresses from the sorted list. If not enough candidates can be computed by this RTS and if a parent (more global) RTS is known, pass the request upward and append the results of that search to the results of the current search.

Listed below are the types of tables used by the route termination server 50 to keep information that is used in making the routing decision. Information from these tables is used by the route policy program to generate the prioritized list of terminals 30 (and their associated gatekeepers 35, if relevant). The tables include regions, server_service_region, provider_price, server_info, isp_information, isp_partnership, IP_qos_info, PSTN_qos_info and routing_cost_adjustment. The regions table can define ISP dependent entries and ISP independent entries. In a similar method, the server_service_region table can also handle server dependent service regions of an ISP or server independent service regions. The provider_price table is used to define the cost for each terminating ISP for a particular region. The server_info, isp_information and isp_partnership table are defined to keep general information of an ISP and the gateway terminals 28 or 30. The qos_info tables contain quality of service cost adjustments. The cost$_{13}$ adjustment table contains additional cost adjustments that affect the rate selection process.

a) regions table. This table is used to define the pstn regions. It defines a set of phone regions (country code, area code) for routing purposes. The definition can be ISP dependent or ISP independent. This allows an ISP to have its own definition of regions. An ISP can have both its own definitions for some area while sharing other definitions for other areas with other ISPs. For example, Netcom can define its own regions for the USA, e.g, USA_continental_west, USA_continental_middle, USA_continental_east, but it shares the definitions of the other region for the rest of the world with other ISPs. In this case, region entries that are ISP dependent will override the definitions that are ISP independent if they overlap.

| | |
|---|---|
| region: | Mostly, it's a country name, sometimes the country need to be divided into sub-regions. |
| country_code: | The country code of a phone number. |
| need_area_code | 1-need area code, 0-do not need area code. |

The following two fields are required if need_area_code=1.

| | |
|---|---|
| area_code: | The area code of a phone number. |
| isp_dependent_entry | 1-dependent, 0-independent |

Following field is required if isp_dependent_entry=1.

| | |
|---|---|
| isp_id: | ISP ID of the ISP which this entry/definition belongs to. | b) provider_price table. This table is used to keep the price information provided by a terminating ISP for a given price_region (of that terminating ISP):

| | |
|---|---|
| region: | region to which this price applies |
| isp_id: | ISP that provide this terminating price |
| terminating_price: | the price (per minute) of the terminating ISP. |
| effective_date: | date that this price applies. |
| expire_date: | date that this price expires | c) server_service_region table. This table is used to define the regions each gateway server (or servers with same server_group id!=0) serves. If server_group_id=0, the server_id is required and this entry applies to that server. If server_group_id!=0, the server_id is not required and this entry applies to all the servers that have the same server_group_id of that isp.

| | |
|---|---|
| isp_id: | ISP that the server belongs to. |
| server_group_id: | 0-independent. 1–1000 the group id. |
| server_id: | the gateway terminal 30 id of the server, required if server_group_id=0. |
| service_region: | the region this server serves |
| regional_priority: | The priority of the server serving this region. | d) server_13 info table. This table is used to keep the gateway terminal 30 information.

| | |
|---|---|
| isp_id: | ISP that the server belongs to. |
| server_id: | the gateway server id of the server |
| server_ip_port: | the gateway server ip address and port. |
| server_type: | the server type |
| server_group_id: | used to indicate a server group |

Servers with the same server_group_id will have the same service area which is defined in gxxx_server_service_region table. server_group_id range is 1–1000. The server_group_id=0 has the special meaning. Servers with server_group_id=0, will not share the service area definition. Each server need to define their own service area.

e) isp_information table. This table is used to keep the ISP information.

| | |
|---|---|
| isp_id: | The ISP identifier of that ISP, assigned by GRIC |
| isp_name: | The name of ISP. |
| isp_country: | The country of that ISP's primary business unit. |
| production_status: | A value indicating the production status of the ISP |
| service_type: | The same as that used in provider_price. | f) isp_partnership table. This table is used to keep the ISP partnership information.

| | |
|---|---|
| isp_id: | isp that is to be defined by the partnership with other isps. |
| mandatory_partner_tag: | 1-define the mandatory partner here, 0-not defined as mandatory partner here if mandatory_partner=1, following field is required. |
| mandatory_partner_isp_id: | mandatory partner isp that this isp requires. priority_of_mandatory_partner: priority of the mandatory partners if there are more than one. 1–1000. 1000 is the highest. |

| | |
|---|---|
| excluded_partner_tag: | 1-define the excluded partner here, 0-not defined excluded partner if excluded_partner=1, following field is required. |
| excluded_partner_isp_id: | excluded partner isp that this isp will not allow | g) inter_operable table. This table is used to keep the interoperable information of different type of servers (i.e. if the terminals 28 or 30 are different).

| | |
|---|---|
| from_type: | Originating device type, e.g., "openport/1.0" |
| to_type: | Terminating device type, e.g., "netxchange/1.0" |
| service_type: | An identifier that defines the service over which the devices can interoperate. | h) IP_qos_info table. The quality of service tables keep information about the quality cost of transmitting traffic over a certain Internet link. Essentially this is a cost-metric penalty assessed if, for example, a given network has a poor call termination history or some other performance problems. Quality costs have the effect of shifting traffic away from routes that have quality problems.

| | |
|---|---|
| originating_server_id: | The server identifier of an originating device |
| terminating_server_id: | The server identifier of a terminating device |
| cost_adjustment: | A number indicating the cost (in US dollars) to be added to the calculated termination cost to account for reduced QoS over this link |
| is_operating: | If false, this indicates the link is down | i) PSTN_qos_info table. The quality of service tables keep information about the quality cost of transmitting traffic over a certain PSTN link. Essentially this is a cost-metric penalty assessed if, for example, a given network has a poor call termination history or some other performance problems. Quality costs have the effect of shifting traffic away from routes that have quality problems.

| | |
|---|---|
| terminating_server_id: | The server identifier of a terminating device |
| terminating_prefix: | The PSTN prefix for which this link quality applies. If this value is an empty string, the link quality is for all prefixes. |
| cost_adjustment: | A number indicating the cost (in US dollars) to be added to the calculated termination cost to account for reduced QoS over this link |
| is_operating: | If false, this indicates the link is down | j) cos_adjustment table. The cost adjustment table keeps information used to adjust the routing of a service, for example where there is a volume commitment to a particular member that needs to be addressed. Adding a negative cost adjustment for a member has the effect of shifting traffic to that member and vice versa.

| | |
|---|---|
| terminating_ISP_id: | The ISP id of a terminating alliance member |
| region_id: | A PSTN region identifier |
| cost_adjustment: | A signed cost adjustment that is added to |

-continued termination costs for routes to equipment owned by the member and terminating in the region specified.

The collection server 54 collects call detail records (CDRs) for phone servers. Specifically, the server 54 collects, parses, filters, translates and serializes accounting records prior to shipment to the central control system 22.

The integration server 60 is a program that loads CDRs into the database 64.

The database 64 contains the CDRs as well as administrative other information such as, information about member servers, regional partners and rates.

The home authentication server 70 is a server that includes software for making queries to a data file (such as the user data file 74) to determine authorized users of the home ISP.

The user data file 74 is a listing of authorized users of the home ISP and account information, such as payment history etc.

Preferable functions of the API software include enabling communication between the gatekeeper 34 (or gateway terminal 28) and the distributed control system 18, including setting the appropriate parameters for Internet communication with the system 18, supplying the IP address of the locator server 42 and/or for the route termination server 50, transmitting the telephone number for the receiving phone 39 (including the area code) to the route termination server 50, and receiving the IP address for the gatekeeper 35 and/or receiving gateway terminal 30 from the route termination server 50.

The Internet telephone system 10 functions as follows: The initiating party uses one of the telephone sets 38 to access one of the gateway terminals 28. The initiating party uses the keypad of the telephone set 38 to enter data such as an access and/or personal identification number and the destination telephone number. In a roaming situation, the terminal 28 transmits an ARQ to the gatekeeper 34 (if the gatekeeper 34 is used) to begin an authentication process for the phone user. The gatekeeper 34 contacts the http server 42 and thence the authentication server 46 to verify that the initiating party is authorized to place the Internet telephone call (i.e. has an account in good standing with an ISP). The authentication server 46 uses the organization identification provided by the initiating party to contact the home authentication server 70. If the account ID and PIN provided by the initiating party are verified by the home authentication server 70, then the server 70 returns an instruction to the server 46 that the call is authorized. The server 46 returns this authorization to http server 42 and thence to the gatekeeper 34 (or directly to the terminal 28 if no gatekeeper 34 is used) which sends an ACF (ACF stands for admission confirmed) to the terminal 28. In response to the ACF, or initially if this is not a roaming situation, the gateway terminal 28 queries the initiating party to enter the telephone number of the destination party (the destination number). Alternatively, if the destination number was already inputted, the gateway terminal 28 makes the destination number available for further use.

The destination number is transmitted from the terminal 28 to the gatekeeper 34 (or directly from the terminal 28 to the server 50 if no gatekeeper 34 is used), and from there to the route termination server 50 via the http server 42. The server 50 uses the destination number to generate a list of possible terminating terminals 30 as was explained previously with respect to FIG. 4. Preferably, this list includes the IP addresses for a plurality of associated gateway terminals 30. The whole list is then transmitted to the gateway terminal 28 that attempts to make an Internet connection to the first gateway terminal 30 on the list. If the connection cannot be made to the first gateway terminal 30 on the list, then the second IP address on the list is utilized to attempt to make the connection through the second gateway 30. This process is repeated until a successful connection is made or until every IP address on the list has been tried.

Once the gateway 28 has successfully connected to the gateway 30, call setup data, such as data required by the H.323 standard, or by another protocol, is transmitted from the gateway 28.

The gateway terminal (server) 28 and the gateway terminal (server) 30 are then directly connected over the Internet and exchange signaling, control and voice data. After the terminals 28 and 30 have established contact over the Internet, the terminal 30 uses the destination telephone number and the PSTN network to ring the telephone set 39. If the telephone set 39 is answered, voice communications between the initiating party and the receiving party, over the Internet, can take place.

Referring to FIG. 1 and the discussion presented above, it should be appreciated that the purpose of the present invention is to provide the route termination server 50 that communicates with the call originating system 14, preferably via the Internet. Whether this communication is through the gatekeeper 34, directly with the gateway terminal 28 or through some other route is immaterial to the present invention. Similarly, it is immaterial to the present invention specifically how the call originating system 14 communicates with the call terminating system 15. Ultimately, the gateway terminals 28 and 30 communicate directly with each other.

In general, the present invention can be summarized as a method for controlling Internet telephone calls comprising the steps of:

1) transmitting a destination telephone number information from the call originating system 14 to the http server 42 and thence to the route termination server 50 over the Internet;

2) using the tree search algorithm to generate a list of gateway servers 30 that can terminate the destination telephone number;

3) using a route policy program to prioritize the gateway servers 30 on the list; and 4) transmitting gateway server identification information from the route termination server 50 back to the call originating system 14 after the route policy means has selected the gateway 30. The server identification information includes information that is used by the call originating system 15 to establish an Internet connection with the gateway terminal 30.

The use of a tree search algorithm in the present invention, to identify potential gateway terminals 30 (also referred to as gateway servers 30), can be summarized as follows: At least part of a destination telephone number is selected by the tree search algorithm_and is used as the PstnPrefix parameter. Preferably, the PstnPrefix parameter includes the country code and the area code of the destination telephone number. In some embodiments, it can also include the exchange prefix. In the telephone number 1-408-555-1212, "1" is the country code, "408" is the area code, and "555" is the exchange code. Each of the numerals in the telephone number is referred to as a digit. Many country codes have more than one digit. From this example it can be seen that the PstnPrefix parameter is a continuous sequence of digits including the first digit on the left hand side of the destination telephone number, and ending at some convenient digit within the telephone number, such as the last digit of the area code. For reference purposes, the left-most digit is referred to as the first digit, the next digit is the second digit, the next digit is the third digit, etc.

The tree search algorithm is written in Java™ programming language. The tree which is used in the tree search algorithm comprises a plurality of nodes (nodes 124–148, in FIG. 4). Each node comprises a digit field, an object field and a children array. The digit field holds a single digit between zero and nine corresponding to the digit in the PstnPrefix parameter which the node represents. The object field holds an object which identifies servers that can terminate Internet telephone calls beginning with a specified digit string. The digit string comprises the sequence of all of the digits from the PstnPrefix parameter that have been fed into the tree search algorithm up to, and including, the current node. Hence, in FIG. 4, the object field in node 138 holds an object that identifies servers that can terminate Internet telephone calls for destination telephone numbers beginning with the sequence 1408 (hypens in telephone numbers are discarded). The object includes the IP address of each call terminating server.

The children array is an array with ten entries (PrefixSearchTrees) corresponding to the numerals zero through nine (i.e. 0 , 1 , . . . , 9). The entries are referred to as children, or individually as a child. Each child either leads to another node in a subtree, or is null, meaning it does not lead to a subtree. A search stops when the pointer points to a child that is null. A subtree is just a branch of a tree, so a subtree is comprised of nodes just like the tree is.

The tree search algorithm takes the first (leading) digit from the PstnPrefix parameter and indexes it into the children array for the top node in the tree (node 124). If the child in the children array of the top node that corresponds to the leading digit is not null, then the pointer points to a second node (e.g. node 128) that contains the first (leading) digit in its digit field. The second node (e.g. node 128) includes an object that is either null or identifies servers that can terminate Internet telephone calls for destination telephone numbers beginning with the leading digit. This object is added to a list (Vector) which is passed down the tree with the stripped PstnPrefix.

The tree search algorithm then takes the second digit in the PstnPrefix parameter and indexes the second digit into the children array of the second node. If the child in the children array of the second node (node 128) that corresponds to the second digit is not null, then the pointer points to a third node (e.g. node 132 or node 140) that contains the second digit in its digit field. The third node (node 132) includes an object that is either null, or that identifies servers that can terminate Internet telephone calls for destination telephone numbers beginning with the first digit and the second digit. This object is added to a list (Vector) which is passed down the tree with the stripped PstnPrefix.

The tree search algorithm then takes the third digit in the PstnPrefix parameter and indexes the third digit into the children array of the third node. The process is repeated until the child in a node corresponding to the next leading digit is null, or until all of the digits in the PstnPrefix parameter are used. At that point, the tree search stops and the list of equipment is ready for further processing.

The list of equipment is then prioritized according to a route policy program. The route policy program prioritizes the plurality of potential gateway terminals 30 based on steps such as choosing the originating ISP's mandatory partners' gateway (if any) to terminate the telephone call; choosing the originating ISP's preferred partners' gateway (if any) to terminate the telephone call; choosing the lowest cost available terminating server to terminate the telephone call; and choosing the gateway that has the highest quality of service to terminate the telephone call.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method for selecting servers for terminating an Internet telephone call, comprising the steps of:
   a. assembling at least part of a destination telephone number as a PstnPrefix parameter for use in a tree search, the PstnPrefix parameter comprising a continuous sequence of digits from at least part of the destination telephone number;
   b. inputting a first digit of the PstnPrefix parameter into a children array field of a first node in a tree, the first digit comprising the first numeral in the PstnPrefix parameter, the tree comprising a plurality of nodes each having a digit field, an object field and a children array field, the digit field either being null or comprising a numeral that corresponds to one of the digits in the PstnPrefix parameter or being null, the object field either being null or comprising an object which identifies servers which can terminate certain Internet telephone calls, and the children array field comprising an array of ten child entries, with each child entry either leading to another node or being null;
   c. if a child entry in the first node corresponding to the first digit is not null, moving to a second node, the second node containing the first digit in the digit field;
   d. if the second node includes an object that is not null, adding the object to an equipment list, the object identifying one or more one-digit servers that can terminate Internet telephone calls for destination telephone numbers beginning with the first digit;
   e. inputting the second digit of the PstnPrefix parameter into the child array of the second node;
   f. if a child entry in the second node corresponding to the second digit is not null, moving to a third node, the third node containing the second digit in the digit field;
   g. if the third node includes an object that is not null, adding the object to the equipment list, the object identifying one or more two-digit servers that can only terminate Internet telephone calls for destination telephone numbers beginning with the first digit and the second digit; and
   h. continuing to move to additional nodes until all of the digits in the PstnPrefix parameter have been used, and continuing to add additional objects to the equipment list if the additional objects are not null, the additional objects identifying additional servers that can only terminate Internet telephone calls for destination telephone numbers beginning with the first digit, the second digit, and at least one additional digit.

2. The method of claim 1 further comprising the step of:
   i. ranking the servers in the equipment list so that the additional server is given a higher preference for use than the two-digit server, and so that the two-digit server is given a higher preference for use than the one-digit server.

3. The method of claim 1 further comprising the steps of:
i. ranking the servers in the list according to a route policy consideration, the route policy consideration including a quality of service component; and
j. transmitting server identification information for one or more of the servers, from a route termination server back to a call originating server after the servers have been ranked, the server identification information including information that is used by the call originating server to establish an Internet connection with the call terminating server so that an Internet telephone call between the call originating server and the call terminating server can be completed.

4. The method of claim 3 wherein the quality of service component comprises a penalty assigned to an Internet link that has a poor performance history.

5. The method of claim 3 wherein the quality of service component comprises a penalty assigned to a PSTN link that has a poor performance history.

6. The method of claim 1 wherein the child entries correspond to one of the numerals zero through nine.

7. A method for selecting servers for terminating an Internet telephone call, comprising the steps of:
selecting a prefix parameter including a sequence of digits of at least a part of a destination telephone number for the Internet telephone call;
obtaining identification of the servers that can terminate the Internet telephone call from routing information arranged in a tree data structure including a plurality of nodes, each of the nodes including a digit field, an object field, and a children field, the digit field including one or more digits corresponding to said each of the nodes, the object field including an object identifying the server corresponding to said each of the nodes, and the children field pointing to a sub-tree of said each of the nodes, wherein the step of obtaining identification of the servers comprises:
obtaining a first object from a first object field of a first node corresponding to a first portion of the prefix parameter; and
obtaining a second object from a second object field of a second node corresponding to a second portion of the prefix parameter other than the first portion of the prefix parameter, the second node being included in the sub-tree pointed to by the children field of the first node, and the first object and the second object identifying the servers that can terminate the Internet telephone call.

8. The method of claim 7, further comprising the step of:
ranking the servers identified by the first object and the second object according to a preference of use, the preference of use being based on a quality of service component.

9. The method of claim 8, wherein the quality of service component comprises a penalty assigned to an Internet link that has a poor performance history.

10. The method of claim 8, wherein the quality of service component comprises a penalty assigned to a PSTN (Public Switched Telephone Network) link that has a poor performance history.

* * * * *